April 14, 1970     B. R. COLEMAN     3,505,738
SYSTEM FREQUENCY RESPONSE ANALYZER AND PLOTTER
Filed March 29, 1968     8 Sheets-Sheet 2

INVENTOR.
BENNY R. COLEMAN
BY
Woodhams, Blanchard & Flynn
ATTORNEYS

April 14, 1970 B. R. COLEMAN 3,505,738
SYSTEM FREQUENCY RESPONSE ANALYZER AND PLOTTER
Filed March 29, 1968 8 Sheets-Sheet 5

INVENTOR.
BENNY R. COLEMAN
BY
Woodhams, Blanchard & Flynn
ATTORNEYS

April 14, 1970   B. R. COLEMAN   3,505,738
SYSTEM FREQUENCY RESPONSE ANALYZER AND PLOTTER
Filed March 29, 1968   8 Sheets-Sheet 7

INVENTOR.
BENNY R. COLEMAN
BY
Woodhams, Blanchard & Flynn
ATTORNEYS

United States Patent Office 3,505,738
Patented Apr. 14, 1970

3,505,738
SYSTEM FREQUENCY RESPONSE ANALYZER
AND PLOTTER
Benny R. Coleman, Union Hill Road, R.F.D. 2,
Nicholasville, Ky. 40356
Filed Mar. 29, 1968, Ser. No. 717,469
Int. Cl. G01c 21/20
U.S. Cl. 33—1                      14 Claims

ABSTRACT OF THE DISCLOSURE

A frequency response calculator and plotter including a board adapted to have a sheet of graph paper mounted thereon, and complex slide means movable both longitudinally and transversely relative to the graph paper to analyze, mechanically calculate and plot an overall system response curve from a plurality of individual system component curves. A family of templates, representing commonly encountered complex transfer functions, are positionable on the board to permit the response curves of the individual components to be quickly and efficiently plotted.

FIELD OF THE INVENTION

The invention relates to a device for analyzing and plotting the frequency response of a control system.

BACKGROUND OF THE INVENTION

In the art of control systems, it is often necessary to analyze the overall dynamic performance of the system. To analyze the overall system, it is first necessary to calculate the dynamic characteristics of each of the control components within the system, which individual characteristics must then be analyzed to determine the performance of the complete system. These calculations and analyses are common to both open and closed loop types of control systems and, without the aid of some form of calculator, are complicated and extremely time consuming.

One of the more common control problems encountered is the determination of the overall response of a control system having a number of control components connected in series therein when the system is excited or subjected to an input disturbance having an amplitude which varies, such as in the manner of a sinusoidal wave, as the input frequency varies. The overall response caused by such a variable input disturbance is generally referred to as an open loop frequency response of the control system.

An ideal control system would be one having an output which would conform exactly with the input disturbance both in amplitude and in phase. However, as is well known, this rarely happens. Rather, this lack of conformity between the amplitude and/or phase of the input and output of the system often causes a control system to be unstable. One form of instability is evident when the output of the control system varies in a cyclic manner even though no disturbance is applied to the input of the system. Obviously, such instability in a control system is highly undesirable.

Thus, it is necessary to determine prior to building or assembling a control system if the system contains any unstable points or conditions therein. To determine if any instability exists in the system, the open loop frequency response of the system is analytically calculated as explained above. Thus, there exists a need for an efficient and accurate means for performing this task.

The analytical steps required for calculating the open loop frequency response of the system are fairly well known. First, the control mode of the system is determined. This thus defines how and what components are necessary in a system. The mathematical definition or transfer functions of the dynamic and static characteristics of the individual components are then determined so as to define how the output of each component will act for a given disturbance on its input. Individual components are then mathematically connected together in accordance with the control mode previously determined. At this point, the laborious part of the calculation of the frequency response begins, that is, the determination of the open loop frequency response of the overall control system.

To assist in performing the calculations involved in determining the open loop frequency response, various devices are available, such as frequency response slide rules, calculators, transfer function analyzers, etc. A typical one of these devices consists primarily of a number of elongated slides placed in parallel relationship to each other in a transparent container. Each slide represents a particular transfer function and has available on its face the ratio in decibels of the output to the input amplitude and their corresponding phase relationship in degrees for a sine wave input disturbance. Each of these slides is generally set in a particular relationship to a common slide whose face contains the input disturbance frequency in cycles per second along its length. Further, the transparent housing or container generally has a movable index line mounted thereon. In using this particular type of device to determine the amplitude ratio and phase shift of the system, the movable index line is set at a particular frequency and the amplitude ratio and phase shift at the point where the index line crosses each transfer function slide is added algebraically. This thus involves a large amount of interpolation of nonlinear scales. The amplitude ratio and phase shift at a multiple number of frequencies is then tabulated and plotted so as to result in the frequency response of the overall system.

While devices of the above type have permitted the determination of the frequency response of the system, they are undesirable in that they require that the operator of the device perform substantial mental manipulations, such as algebraic addition and nonlinear interpolation, in order to reach the final frequency response of the system. Further, many of the known devices require that the operator of the device tabulates substantial amounts of data, such as the amplitude ratio and phase shift at a substantial number of different frequencies, in order to permit a final plot or graph of the overall frequency response of the system to be determined. Such devices thus require a substantial amount of time for performing the desired frequency response calculation and also greatly increase the possibility of an error being made during the calculation.

The device according to the present invention is able to perform and calculate the overall frequency response of a control system with less error and in less time than the prior known devices since the present invention substantially eliminates any mental manipulations by the operator by not requiring the operator to perform any algebraic addition or nonlinear interpolation. Further, in utilizing the device according to the present invention, there is no need for the operator to tabulate data since the device permits the data to be automatically tabulated and plotted at each desired frequency value merely by correct manual manipulation of the device by the operator. The device according to the present invention thus permits the overall frequency response of a control system to be quickly and efficiently calculated in a routine manner involving very little possibility of error.

SUMMARY OF THE INVENTION

The objects and purposes of the present invention are accomplished by providing a plotting board adapted to have graph paper, such as semi-log graph paper, mounted on the surface thereof. The graph paper is adapted to have plotted thereon curves representing the frequency response of the individual components of the system, in particular, curves of amplitude ratio versus frequency and phase shift versus frequency. A plurality of templates are provided, which templates each have curves formed thereon representing various well-known transfer functions which represent the frequency response curves of well-known components. These templates thus permit the frequency response curves of the individual components of the control system to be quickly and easily drawn or plotted on the semi-log graph paper mounted on the plotting board. The plotting board is further provided with a first slide member extending transversely thereacross, the slide member being movable longitudinally of the board in a direction so as to vary the selected frequency as plotted longitudinally across the length of the graph paper. The first slide means is thus movable longitudinally so as to permit a desired frequency to be selected. A second slide member is mounted on the first slide member for slideable movement longitudinally therealong, the second slide member thus being movable to permit variation in the amplitude ratio or phase shifts values plotted in this direction. A third slide member is slideably mounted on the second slide member for slideable movement relative to both the first and second slide members, both the second and third slide members being slideably moveable in a direction substantially transverse of the movement of the first slide member. To operate the device, the operator first moves the first slide member to the desired frequency, whereupon the first slide member is then maintained stationary. The second and third slide members are then moved relative to one another and relative to the first slide member so as to algebraically add either the amplitude ratio or the phase shift of the individual frequency curves at the selected frequency, the sum resulting from the algebraic addition of the individual curves then being plotted on the graph paper by means of a plotting member mounted upon the third slide member. This operation is performed for any desired number of selected frequencies so as to produce a curve or plot representing the resultant frequency curve of the overall control system.

DETAILED DESCRIPTION

Figure 1:
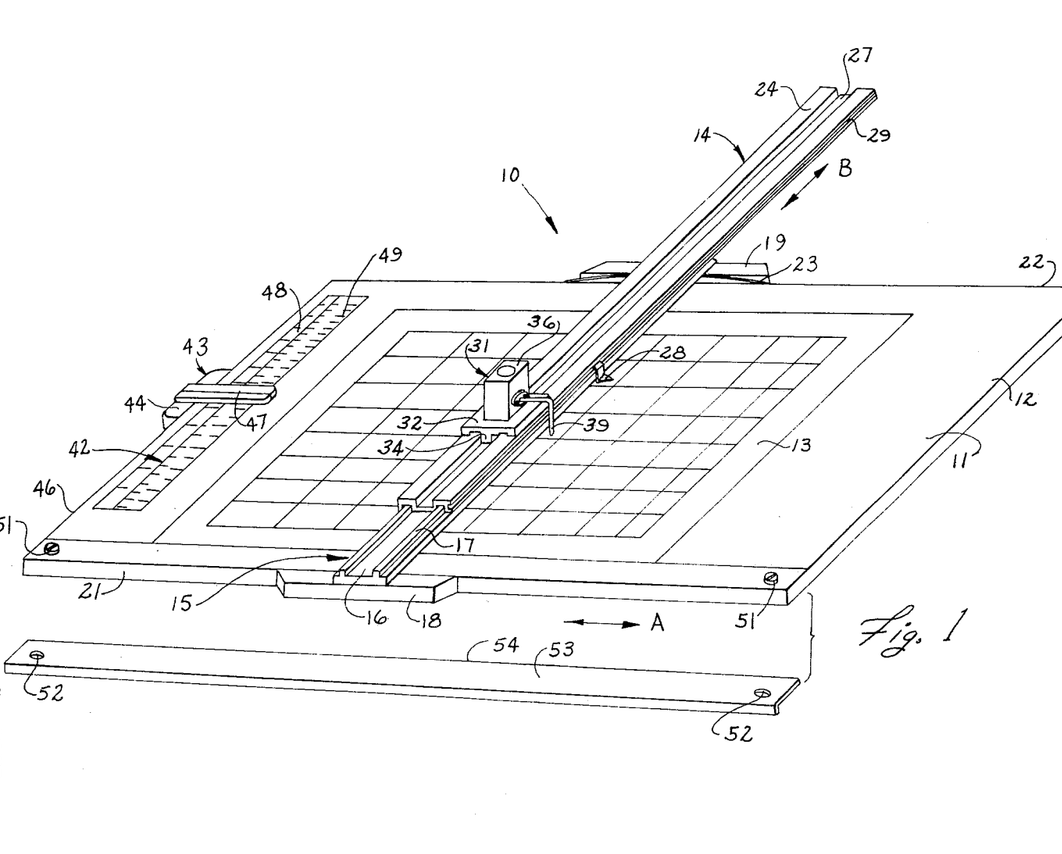
FIGURE 1 is an isometric view of the frequency response analyzer and plotter according to the present invention.
Figure 2:
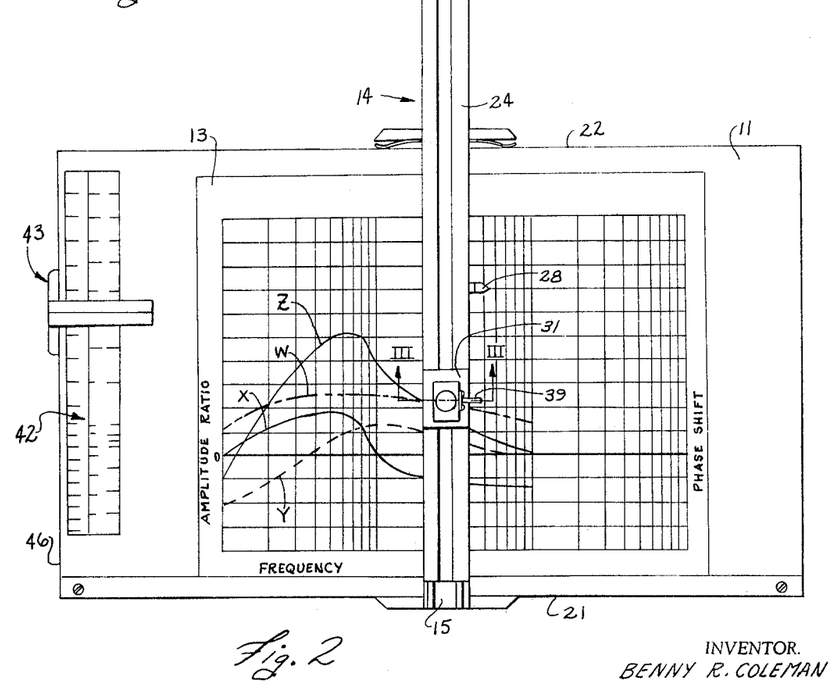
FIGURE 2 is a top view of the analyzer and plotter illustrated in FIGURE 1.

FIGURES 1 and 2 illustrate therein an apparatus for plotting and analyzing the frequency response of the individual components of the control system. The frequency response analyzer and plotter apparatus, designated in general by the reference numeral 10, comprising a substantially rectangular plotter board 11 having an upper surface 12 adapted to have positioned thereon a sheet of graph paper 13, which graph paper is preferably three cycle, semi-log paper. The paper is preferably positioned on the board such that the nonlinear scale thereof extends substantially lengthwise of the board 11, which nonlinear scale represents the frequency of the system. The transversely extending linear scale on the graph paper represents the amplitude ratio and the phase shift of the control system. In particular, the left-hand side of the paper is preferably designated as the amplitude ratio, that is, the ratio of output amplitude to input amplitude. Similarly, the right-hand side of the paper is preferably designated as the phase angle, that is, the angle by which the output leads or lags the input. The amplitude ratio is preferably plotted in units of decibels due to the ease of handling and computing amplitude ratios when expressed in these units.

A complex slide means 14 is mounted for slideable movement both transversely and longitudinally with respect to the board 11. The slide means 14 includes therein a first slide member 15, hereinafter referred to as the frequency slide, which comprises an elongated intermediate member 16 having a pair of substantially parallel ridges 17 extending lengthwise along the upper surface thereof. The intermediate member 16 is only slightly longer than the width of the board 11 and has guide members 18 and 19 fixedly interconnected thereto adjacent opposite ends thereof. The guide members 18 and 19 are positioned adjacent to and in slideable engagement with the sides 21 and 22 of the board 11. The guide members 18 and 19 extend substantially transversely to the longitudinal direction of the intermediate member 16 whereby the intermediate member thus extends transversely across the board 11, the frequency slide 15 thus being substantially perpendicular to the lower edge of the graph paper 13. The frequency slide 15 is further provided with a leaf spring 23 positioned between the guide member 19 and the side 22 for resiliently maintaining the first slide 15 in a selected position. The frequency slide 15 is thus selectively movable lengthwise of the board in the direction A so as to permit the slide to be positioned at a selected system frequency.

A second slide member 24, hereinafter referred to as the totalizer slide, is slideably mounted on the frequency slide 15. The totalizer slide 24 has a pair of longitudinally extending, substantially parallel recesses 26 (FIGURE 3) provided in the lower surface thereof, which recesses receive therein the ridges 17 formed on the upper surface of the frequency slide 15. The totalizer slide 24 preferably has a length which is substantially greater than the length of the frequency slide 15 and is slideable longitudinally relative thereto along the direction B. The totalizer slide 24 is also provided with a longitudinally extending recess 27 in the upper surface thereof for a purpose to be explained hereinafter. A pointer or index member 28 is interconnected to the totalizer slide 24 and extends transversely therefrom, the pointer being substantially Z-shaped so that the lower edge thereof is positioned closely adjacent the surface of the graph paper 13. The index member 28 is provided with a hook portion 28A on the end thereof slideably received within an elongated, triangular-shaped groove 29 extending lengthwise of the totalizer slide 24, the hook portion 28A permitting the index member to be slideably moved longitudinally of the groove while at the same time resiliently expanding and gripping the sidewalls of the groove for holding the index member 28 in a selected position. The pointer 28 is preferably positioned on the totalizer slide 24 substantially at the midpoint thereof so as to facilitate utilization of the apparatus.

Figure 3:
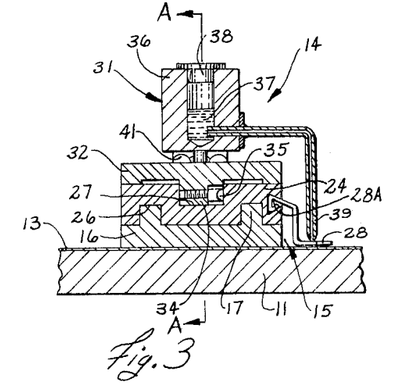
FIGURE 3 is a partial sectional view taken on the line III—III of FIGURE 2.
Figure 3A:
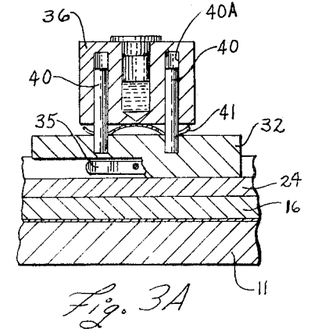
FIGURE 3A is a partial sectional view taken on the line A—A of FIGURE 3.

A third slide member 31, hereinafter referred to as an adder slide, is mounted on the totalizer slide 24 and is slidable both longitudinally of and relative to both the totalizer slide 24 and the frequency slide 15. The adder slide 31 includes a base portion 32 which is slideable adjacent to the upper surface 33 of the totalizer silde 24, the base portion having a ridge 34 projecting from the lower surface thereof and slideably positioned within the recess 27 whereby the adder slide 31 is thus slidably guided for longitudinal movement relative to the totalizer slide 24. The ridge 34 is provided with a leaf spring 35 fixedly secured to the sidewalls thereof, which leaf spring is in slideable engagement with the recess 27 so as to frictionally engage and hold the adder slide 31 in a selected position. The base portion 32 of the adder slide 31 is provided with a pair of pins 40 fixedly secured thereto and extending upwardly therefrom, which pins are slideably received within openings 40A formed within an upper poriton 36. The upper portion 36 is provided with an opening 37 which functions as an ink reservoir, the upper end of the opening 37 being closed by means of a removable cap 38. An L-shaped plotting member 39, such as a pen, is interconnected to the upper portion 36 and is in communication with the ink reservoir 37 contained therein. The lower end of the plotting member 39 is positioned substantially adjacent to but slightly above the surface of the graph paper 13. A spring 41, such as an H-shaped leaf spring, is positioned between the base portion 32 and the upper portion 36, being held therebetween by means of the pins 40 extending between the adjacent legs of the H-shaped leaf spring 41. The spring 41 biases the upper portion 36 upwardly relative to the lower portion 32, thereby maintaining the lowermost point of the plotting member 39 out of contact with the graph paper 13. However, manual depression of the upper portion 36 against the bias of the spring 41 causes the lower end or tip of the pen 39 to contact the graph paper so as to leave a depression or point thereon.

The plotting board 11 is additionally provided with a conversion scale 42 adjacent one edge thereof, which conversion scale includes first and second scales 48 and 49 thereon, the first scale 48 being a dimensionless linear plot of amplitude ratio, the second scale 49 being a nonlinear plot of amplitude ratio expressed in the units of decibels. A T-shaped slide member 43 is provided on the plotting board, which slide member has a guide portion 44 in slidable engagement with the end wall 46 of the plotting board. An index portion 47, preferably of transparent material, is connected to the guide portion 44 and extends transversely across the conversion scale, the index member 47 preferably having a hair line extending lengthwise thereof so as to permit the amplitude ratio, as read from the first scale 48, to be rapidly converted into decibels as read from the second scale 49.

The plotting board 11 is further provided with a pair of pins 51 extending upwardly from the upper surface 12 adjacent the opposite bottom corners thereof. The pins 51 are adapted to be positioned within a pair of openings 52 which are formed in the opposite ends of an L-shaped straight edge member 53. The straight edge member 53 can be positioned on the plotting board 11 by having the pins 51 project through the openings 52 when the complex slide means 14 is removed from the board. The straight edge member 53 has a leading edge 54 thereon which, when the straight edge is positioned on the board, is substantially parallel to the bottom edge of the graph paper 13. Removal of the straight edge member 53 from the board permits the complex slide means 14 to again be mounted on the board.

The apparatus illustrated in FIGURES 1 and 2 is also, preferably provided with a set of templates, these being thirteen templates in the illustrated embodiment, which represent the amplitude ratio and phase shift of the individual control components having particular dynamic characteristics, which characteristics can be described mathematically by known complex transfer functions. The set of templates represents the most commonly encountered transfer functions used in computing frequency response in control systems. The transfer function permits, when given a particular numerical input frequency, the amplitude ratio and phase shift at that particular frequency to be calculated. Accordingly, by performing a series of individual calculations for differnt input frequencies, the response of the individual component in terms of amplitude ratio and phase shift can be calculated and plotted. The set of templates provided with the present invention eliminate the need for this long and laborious series of mathematical calculations since the templates have formed thereon curves which represent the most commonly encountered transfer functions and thus the frequency response of the individual control components can be quickly and easily plotted on the graph paper with very little possibility for error.

The templates preferably represent the amplitude ratio in decibels and the phase shaft in degrees, in accordance with the units utilized on the graph paper 13. The units of frequency can be whatever unit desired, the most commonly used units being cycles per second, cycles per minute, cycles per day, radians per second, etc.

FIGURES 4–16 illustrate therein templates I through XIII, respectively, which templates describe the most commonly encountered transfer function. These transfer functions are $(ju)$, $(1/ju)$, $(ju)^2$, $(1/ju)^2$, $(1+ju)$, $$\left(\frac{1}{1+ju}\right)$$

$$(1-ju)$$

$$\left(\frac{1}{1-ju}\right)$$

$$(e)^{-ju}$$

$$\left[1+\frac{2\xi}{ju}+\frac{1}{(ju)^2}\right]$$

and $$\left[\frac{1}{1+\frac{2\xi}{ju}+\frac{1}{(ju)^2}}\right]$$

These transfer functions are written in the form of complex members using real and imaginary components since frequency response calculations can best be carried out utilizing complex members rather than utilizing vector addition. In these equations, the symbol $j$ is used in the conventional manner to represent the imaginary number notation and is equal to the square root of minus one $(j=\sqrt{-1})$. The symbol $u$ is equal to the product $\omega t$ wherein $\omega$ is the angular frequency and $t$ is time. The angular frequency $\omega$ is of course equal to $2\pi f$ with $f$ being the linear frequency. With the set of thirteen templates illustrated in FIGURES 4–16, it is possible to graphically describe on graph paper 13 the amplitude ratio and phase shift of twenty nine of the most commonly encountered fundamental complex transfer functions of the type set forth above.

Considering the transfer functions $(ju)$, $(1/ju)$, $(ju)^2$ and $(1/ju)^2$, these functions all have amplitude ratios which lie on straight lines and have a slope of $\pm 20$ or $\pm 40$ decibels per decade. Further, the phase shift in these transfer functions is constant, being either $\pm 90$ or $\pm 180$ degrees. The triangular shaped template I (FIGURE 4) is provided for plotting the amplitude ratios of these transfer functions.

Figures 4, 5:
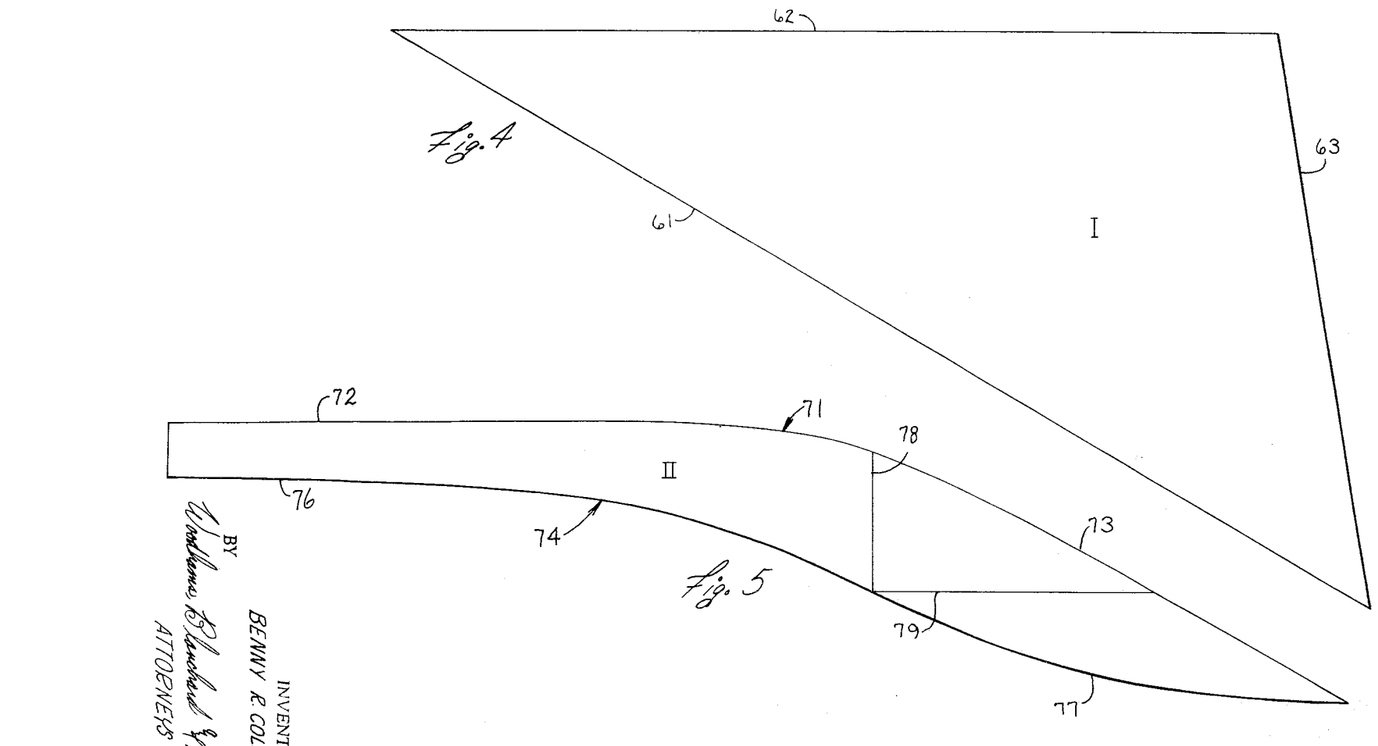
FIGURE 4 illustrates the configuration of one of the templates used in conjunction with the analyzer and plotter of the present invention.
FIGURES 5–16 illustrate additional templates used with the frequency response analyzer and plotter.

The template I is provided with a first edge 61 which functions as a reference edge. The second and third edges 62 and 63 are each formed with slopes of 20 and 40 decibels per decade, respectively, relative to the reference edge 61. The template I, when used to plot one of the above transfer functions, is positioned on the upper surface 12 of the plotting board 11 and the straight edge member 53 is also positioned adjacent the lower edge of the board. The reference edge 61 of the template I is then positioned adjacent the leading edge 54 of the straight edge member whereupon the template can then be slideably moved along the board while maintaining the desired slope for accurately drawing any of the above four transfer functions through any particular frequency. If it is desired to reverse the polarity of the slope of the curves, it is only necessary to rotate the template I so that the opposite surface thereof is flush against the plotting board, whereupon the slopes of the edges 62 and 63 are thereby reversed. Since the corresponding phase shift is of a constant magnitude, being either 90 or 180 degrees, this merely constitutes a horizontal straight line which can be suitably drawn on the paper by utilizing the straight edge member 53.

The template II (FIGURE 5) is used to plot the transfer functions $(1+ju)$, $$\left(\frac{1}{1+ju}\right)$$

or $(1-ju)$ $$\left(\frac{1}{1-ju}\right)$$

Inspection of a plot of each of these transfer functions reveals that the amplitude ratio becomes asymptotic to zero decibels when the input frequency is decreased below the corner frequency, and becomes asymptotic to a straight line having a slope of plus or minus 20 decibels per decade when the input frequency is increased above the corner frequency. This is represented on the template II by means of a first edge 71, which edge corresponds to the amplitude ratio edge. This edge has the leftward end 72 thereof approaching a straight horizontal line which is thus asymptotic to the zero decibel line, while the rightward end 73 of the amplitude ratio edge approaches a straight line having a slope of 20 decibels per decade.

The phase shift of the above four transfer functions exhibits a similar phenomenon in that the phase shift becomes asymptotic to zero degrees when the input frequency is decreased below the corner frequency, and becomes asymptotic to plus or minus 90 degrees when the input frequency is increased above the corner frequency. The phase shift is represented on the template II by means of a second edge 74, which edge represents the phase shift edge. The leftward end 76 approaches a horizontal line which simulates the zero degree asymptote while the rightward end also approaches a horizontal straight line which is parallel to the leftward end 76 except that the rightward end 77 approaches a 90 degree asymptote. In all of the above transfer functions, the amplitude ratio and the phase shift of the control component at the corner frequency is plus or minus 3 decibels and plus or minus 45 degrees, respectively. These points thus appear on the edges 71 and 74, respectively, at opposite ends of the vertical line 78, which vertical line represents the corner frequency. Further, the point of intersection between the corner frequency line 79 and the phase shift edge 74 is further intersected by a horizontal line 79 which thus represents the 45 degree phase shift line.

To use the template II, the vertical line 78 is positioned over the desired corner frequency as designated on the graph paper 13. If the amplitude ratio is to be drawn, the template II is moved transversely across the paper maintaining the vertical line 78 in alignment with the desired corner frequency until the leftward end 72 of the amplitude ratio edge 71 is aligned with the zero decibel reference line on the graph paper. The desired amplitude ratio curve can then be plotted merely by tracing on the graph paper the curve represented by the amplitude ratio edge 71. Obviously, the template can be turned over relative to the graph paper so as to permit the higher frequency amplitude ratio, as represented by the edge 73, to be asymptotic to a line having either a plus or minus 20 decibel per decade slope.

To draw the phase shift curve with the template II, the vertical line 78 is again placed over the corner frequency line as appearing on the graph paper as explained above. The template is then moved transversely across the paper until the left end 76 of the phase shift edge 74 is asymptotic to the horizontal line on the graph paper representing a zero degree phase shift. The horizontal line 79 appearing on the template is utilized to assist in properly positioning the template since it corresponds to the 45 degree phase shift line and permits the template to be properly aligned on the graph paper merely by positioning the horizontal line 79 over the horizontal line representing the 45 degree phase shift point on the graph paper. Of course, as was true when drawing the amplitude ratio, it may be necessary to flip the template relative to the graph paper depending upon whether the phase shift as represented by the right end 77 is to be either a plus or minus phase shift.

The template III (FIGURE 6) is utilized when a control component encounters what is referred to as a "dead time" during which there occurs a phase shift but no attenuation or change in the amplitude ratio. Such a dynamic characteristic is represented by the transfer function $e^{-ju}$. The template III representing this function has only a single usable edge 81 thereon, which edge represents the desired function. Further, this template is provided with a vertical line 82 which represents the frequency corresponding to the "dead time" and a horizontal line 83 which intersects the vertical line 82 at its point of intersection with the edge 81, the horizontal line 83 representing the 57 degree phase shift line on the graph paper. This template is used by placing the horizontal line 83 in alignment with the 57 degree phase shift line on the graph paper 13 and aligning the vertical line 82 with a frequency corresponding to the "dead time" on the graph paper.

FIGURES 7–16 illustrate therein templates IV through XIII, respectively, which templates are utilized for drawing the amplitude ratio and phase shift when the transfer function utilized to represent the dynamic characteristics of the control component involve a numerator or denominator quadratic, such as $$\left[1+\frac{2\xi}{ju}+\frac{1}{(ju)^2}\right]$$

or $$\left[\frac{1}{1+\frac{2\xi}{ju}+\frac{1}{(ju)^2}}\right]$$

The symbol $\xi$ represents the damping ratio, that is, the amount of actual damping in the system or component in proportion to the critical damping coefficient. The templates IV through XIII all represent the amplitude ratio and phase shift curves for the above quadratic-type transfer function having damping therein, the templates IV through XIII representing a damping ratio of 0.05, 0.1, 0.2, 0.3, 0.4, 0.5, 0.6, 0.7, 0.8 and 0.9, respectively.

Considering template IV (FIGURE 7), which represents a damping ratio of 0.05, a plot of the amplitude ratio for this transfer function, as represented by the edge 91, illustrates that the amplitude ratio approaches or becomes asymptotic to zero decibels as the input frequency decreases below the natural frequency of the control component, this being represented by the leftward end 92 of the edge 91. As the input frequency increases above the natural frequency, the amplitude ratio becomes asymptotic to a line having a positive slope of 40 decibels per decade if the transfer function is a numerator quadratic and becomes asymptotic to a line having a negative slope of 40 decibels per decade if the transfer function is a denominator quadratic. This portion of the amplitude ratio plot is illustrated by the rightward end 93 of the edge 91.

Figures 6, 7:
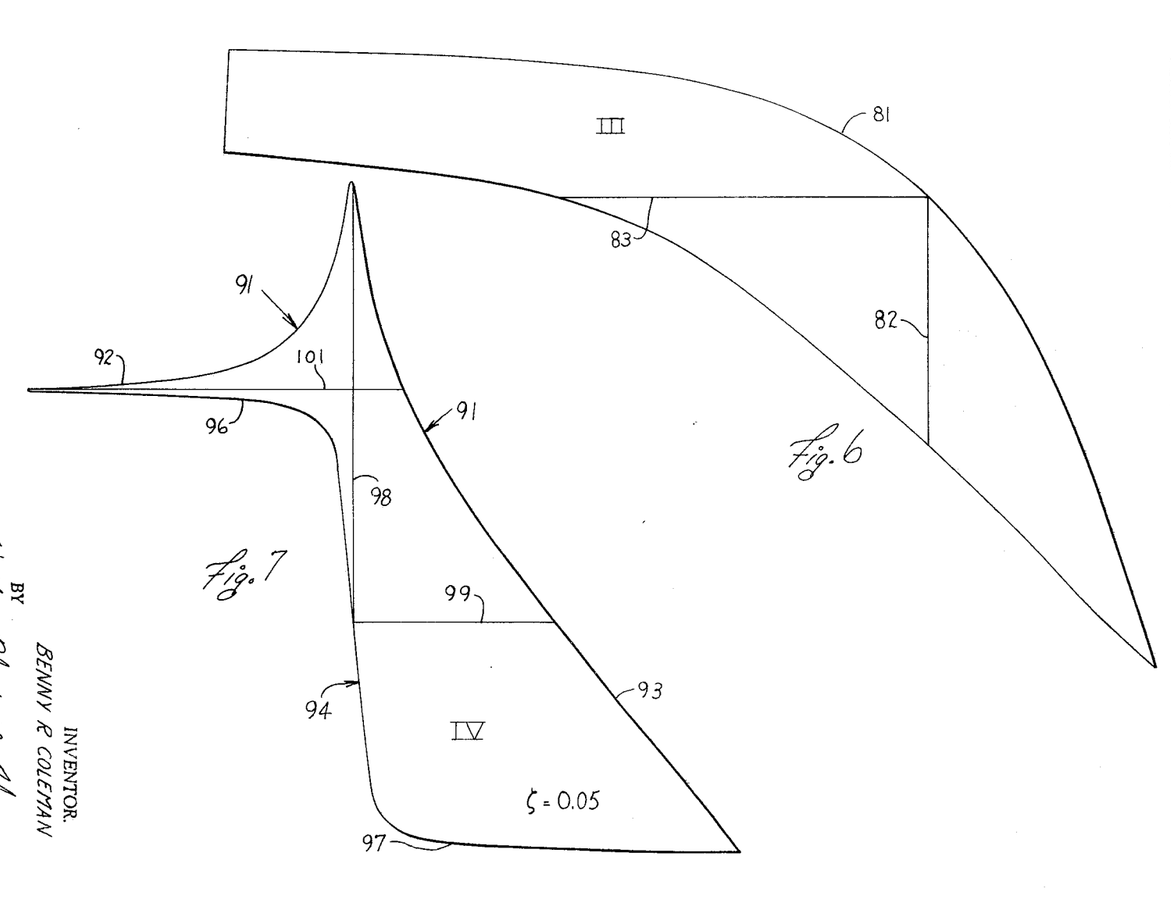
Figures 8, 9:
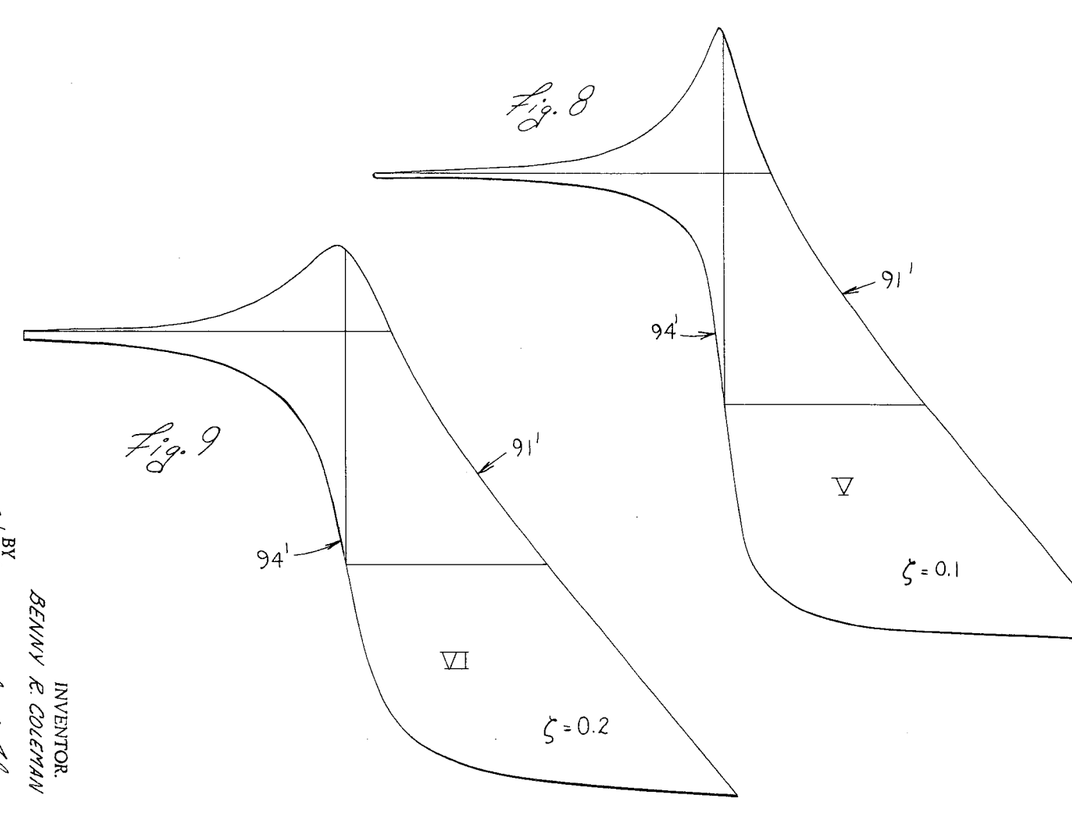
Figures 10, 11:
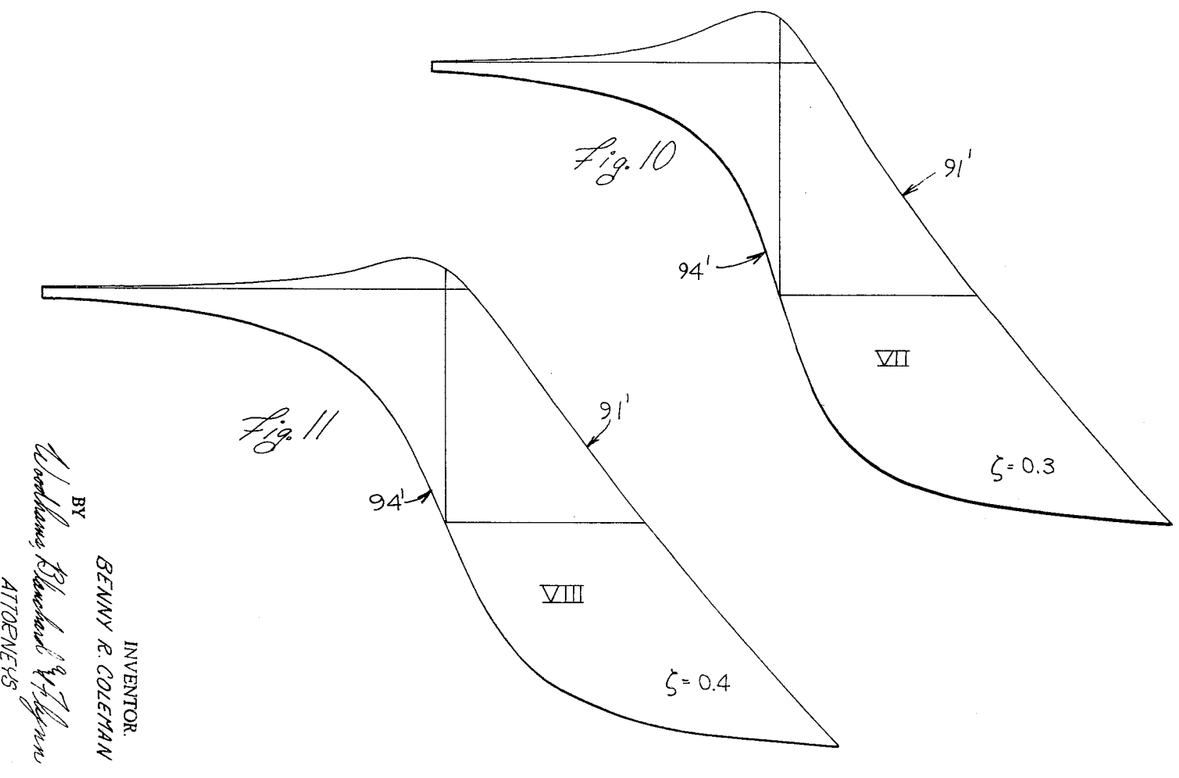
Figures 12, 13:
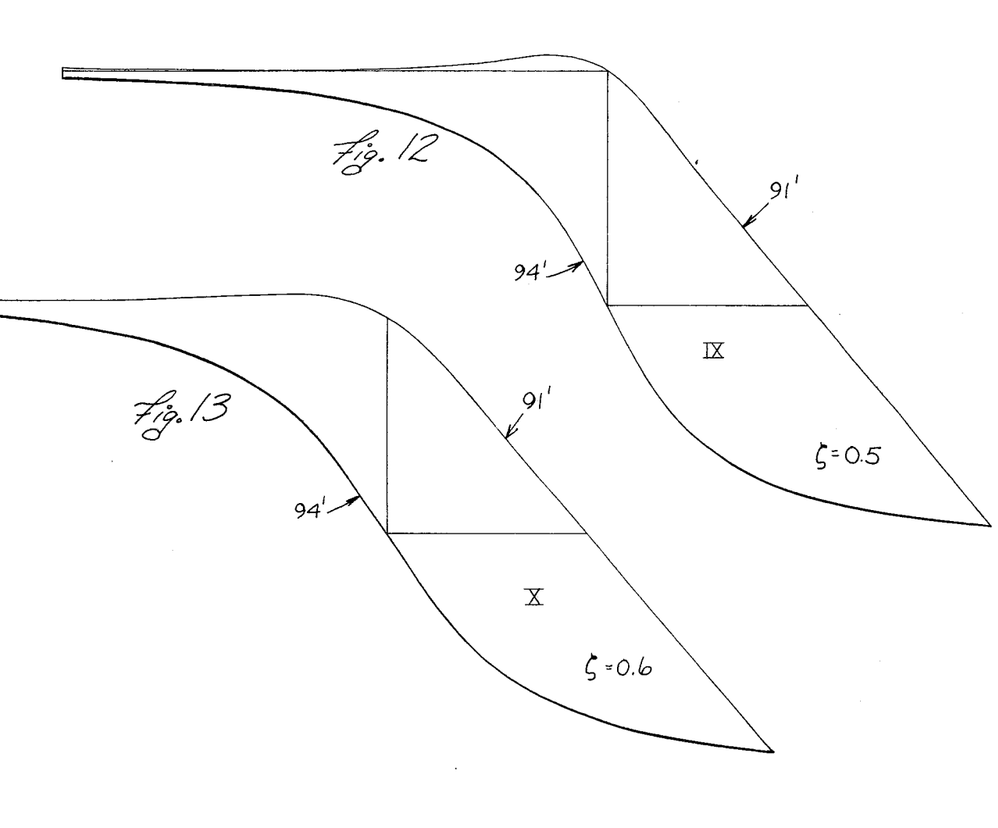
Figures 14, 15, 16:
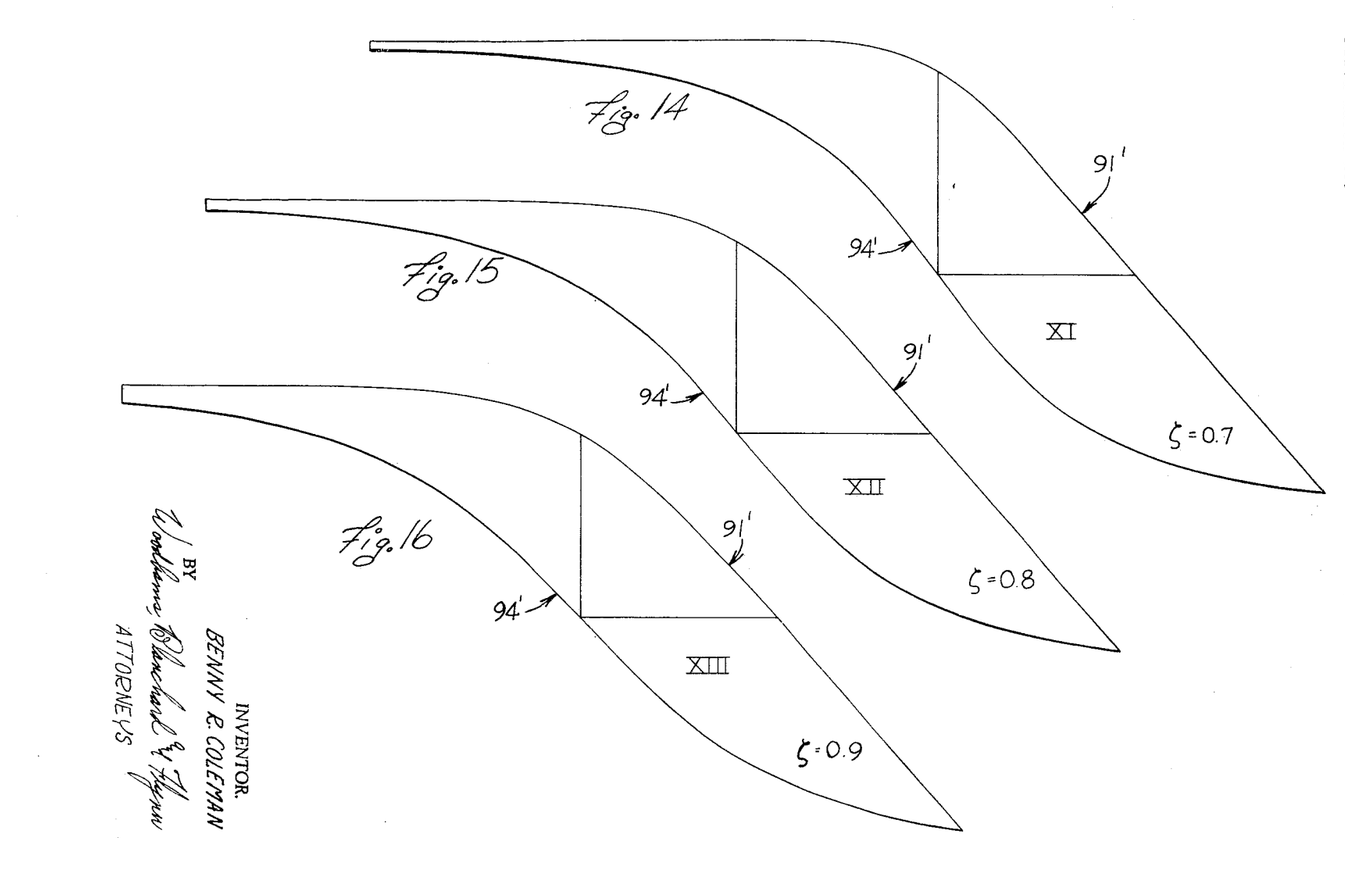

A plot of the phase shift of the above transfer function is represented by the edge 94 and, as illustrated by the leftward end 96, the phase shift becomes asymptotic to zero degrees as the input frequency decreases below the natural frequency. On the other hand, as the input frequency increases above the natural frequency, the phase shift becomes asymptotic to a positive phase shift of 180 degrees if the transfer function is a numerator quadratic and becomes asymptotic to a phase shift of minus 180 degrees if the transfer function is a denominator quadratic. This portion of the transfer function is represented by the rightward end 97 of the edge 94.

As illustrated in FIGURE 7, the template IV is further provided with a vertical line 98 thereon which represents the natural frequency, which natural frequency results in a 90 degree phase shift as represented by the horizontal line 99. The template IV is additionally provided with a second horizontal line 101 thereon, which line is parallel to and laterally displaced from the 90 degree phase shift line 99, the horizontal line 101 being a reference line for alignment with the zero decibel axis on the graph paper.

In using the template IV, the vertical line 98 is positioned in alignment with and directly over the appropriate natural frequency as appearing on the graph paper 13. The template is then moved transversely across the graph paper until the zero decibel edge as represented by the leftward end 92 is aligned with the zero decibel reference line appearing on the graph paper. This alignment is facilitated by use of the additional horizontal line 101 appearing on the template IV. When so positioned, the amplitude ratio can then be plotted or drawn on the graph paper merely by tracing the edge 91. In order to have the proper polarity, the template IV may have to be rotated or turned over about the zero decibel axis depending on whether the transfer function is a numerator or denominator quadratic.

After the amplitude ratio has been plotted, the phase shift can also be plotted merely by moving the template transversely across the paper, maintaining the vertical line 98 in alignment with a desired natural frequency, until the horizontal line 99 is aligned with the 90 degree phase shift line appearing on the graph paper. The phase shift curve can then be plotted merely by tracing the edge 94 of the template. The phase shift will have the proper polarity when the template has been rotated so as to satisfy the necessary polarity requirements for the amplitude ratio and accordingly no additional rotation of the template will be necessary in order to result in the proper polarity on the phase shift curve.

If it should become necessary to extend the amplitude ratio of any transfer function to a frequency beyond that available on the template, the triangular template I can be utilized for this purpose since all of the transfer functions become asymptotic to a slope of either plus or minus 20 or plus or minus 40 decibels per decade as the input frequency increases above the natural frequency, which slopes are available on the triangular template I and can thus be utilized for extending the plot of the amplitude ratio.

The templates V through XIII illustrated in FIGURES 8–16, respectively, are all substantially identical to the template IV illustrated in FIGURE 7 except that the edges thereon representing the amplitude ratio and phase shift, designated as 91' and 94', respectively, have been plotted utilizing different damping ratios as noted thereon. Thus, the structure and use of these templates is substantially identical to the structure and use of the template IV as explained above and accordingly further additional description of these templates is not believed necessary.

OPERATION

To utilize the frequency response analyzing and plotting apparatus according to the present invention, the complex slide means is first removed from the plotting board 11 and the straight edge member 53 is mounted on the board adjacent the lower edge thereof by positioning the pins 51 through the associated openings 52. A sheet of three cycle semi-log graph paper is then positioned on the surface of the board by aligning the bottom edge thereof with the leading edge 54 of the straight edge member. The bottom horizontal axis of the graph paper is then selected as the frequency axis and a suitable frequency scale is selected therefor. Further, the right and left vertical axes of the paper are then selected as the amplitude ratio and phase shift axes, both of which are thus transverse to the common horizontal frequency axis, which axis has three decades over the full length thereof to thereby permit the frequency to vary over a range of from 1 to 1,000. The zero decibel and zero degree reference lines are then drawn horizontally across the graph paper and the amplitude ratio scale and the phase shift scale are labeled by selecting suitable scale factors.

The individual amplitude ratio and phase shift curves for each component of the control system are then plotted or drawn on the graph paper 13 by utilizing one of the individual templates I through XIII corresponding to the dynamic characteristics of the selected component, the templates being utilized in the manner described above. The individual amplitude ratio and phase shift curves for each component of the control system will thus be drawn on the single sheet of graph paper such that, when completed, the graph paper will contain thereon an equal number of individual amplitude ratio curves and phase shift curves, which number will correspond to the number of individual components exerting a dynamic influence on the control system.

After all of the individual amplitude ratio and phase shift curves have been plotted, the straight edge member 53 is removed from the board and the complex slide means 14 is again positioned on the board in the manner as illustrated in FIGURE 1. The device is thus in condition for computing and plotting a single amplitude ratio curve and a single phase shift curve representative of the frequency response of the overall control system when subjected to a variable input frequency.

For purposes of illustration, the curves W, X and Y shown on the graph paper 13 in FIGURE 2 have been drawn to represent the amplitude ratios of the individual components of a control system, which curves must be analyzed and totalized so as to result in a single amplitude ratio curve Z representative of the ratio of output amplitude to input amplitude for the overall control system.

First, the frequency slide 15 is moved longitudinally of the board 11 in either direction A as shown in FIGURE 1 until the pointer or plotting member 39 mounted on the adder slide 31 is positioned directly above the desired frequency. The frequency slide is then held in this position for the completion of this calculation. The totalizer slide 24 is then slideably moved longitudinally of the frequency slide 15 in either directon B until its pointer or index member 28 is aligned with the zero decibel reference line drawn on the graph paper 13. The totalizer slide 24 is then held in position and the adder slide 31 is slideably moved longitudinally of the totalizer slide 24 (along direction B) until its pointer or plotting member 39 intersects one of the amplitude ratio curves, such as the curve W. The adder slide is held fixed relative to the totalizer slide is then slideably moved longitudinally of the frequency slide until the plotting member 39 intersects the zero decibel reference line on the graph paper.

The totalizer slide 24 is again held fixed and the adder slide 31 is again slideably moved longitudinally relative to the totalizer slide until the plotter member 39 intersects another of the curves, such as the curve X. The adder slide 31 is then held fixed relative to the totalizer slide 24 and the totalazer slide is again slideably moved relative to the frequency slide 15 until the plotting member 39 again intersects the zero decibel reference line. At this stage in the calculation, the relative position of the adder slide 31 relative to the index member 28 on the totalizer slide 24 represents a mechanical, algebraic addition of the curves W and X at the particular selected frequency.

The previous steps are again repeated, that is the totalizer slide 24 is held stationary and the adder slide 31 is slideably moved relative to the totalizer slide until the plotter member 39 intersects the remaining curve Y. After the last curve has thus been intersected by the plotter member 39, the totalizer slide 24 is then slideably moved relative to the frequency slide 15 until the index member or pointer 28 thereon is aligned with the zero decibel reference line on the graph paper. When in this latter position, the plotter element 39 is manually depressed so as to contact the graph paper 13 so as to automatically record a point on the graph paper, which point corresponds to the algebraic sum of the curves W, X and Y at the selected frequency.

The frequency slide 15 is then moved longitudinally of the graph paper 13 along the direction A to a new position whereupon the above procedure is then repeated so as to determine a new point for the resutling amplitude ratio curve Z of the overall control system. This procedure is repeated for as many different frequencies as desired so as to produce a sufficient number of points to permit an accurate curve to be drawn therethrough, which curve, such as the curve Z, thus represents the amplitude ratio of the overall system, being an algebraic addition of the individual amplitude ratios of each individual component comprising the system.

It will be obvious that a curve representative of the phase shift occurring in the overall system can be plotted and drawn in this same manner as explained above for the amplitude ratio curve.

The present invention thus permits the frequency response curves of the control system to be quickly and efficiently analyzed and determined with only a minimum possibility of an error being introduced into the system. This is possible since the templates provided with the present apparatus permit the frequency response curves of the individual components of the system to be quickly plotted, which individual plots can then be quickly and mechanically analyzed and algebraically added so as to result in a curve representative of the frequency response of the overall system. This analysis is exceedingly efficient and takes very little time since the plotting of the individual curves is acomplished by templates which have curves formed thereon representative of the most commonly encountered transfer function. Further, additional time is saved in the analysis since the algebraic addition involved is all computed mechanically by means of the complex slide mechanism mounted on the plotting board. Thus, use of the complex slide mechanism and of the set of templates not only permits the calculation to be carried out quickly and efficiently, but it also results in a minimum possibility for error since the operator of the device does not have to carry out a great number of complex and time-consuming mathematical calculations as was true of the prior art devices.

The apparatus according to the present invention can be inexpensively manufactured and produced since a majority of the components comprising the apparatus can be fabricated from plastic or other suitable inexpensive materials. Further, the templates are preferably constructed from a clear plastic so as to not obstruct the visibility of the graph paper when being utilized for plotting curves. Further, the plotting board, the complex slide mechanism and the templates can be easily mounted within a small carrying case whereupon the apparatus can be conveniently and safely transported so as to be readily available and usable where and when desired.

While the present invention has been disclosed as being preferably usable with a three cycle semi-log paper, it will of course be recognized that other graph paper having either a different number of cycles or paper not of the semi-log type could be used. Further, while the templates have been preferably disclosed as having curvatures thereon corresponding to the transfer functions set forth above, it will be recognized that the templates could have formed thereon other or additional transfer or mathematical functions corresponding to whatever functions desired or most commonly encountered.

While a particular preferred embodiment of the invention has been disclosed above for illustrative purposes, it will be recognized that variations or modifications thereof are fully contemplated.

The embodiments of the invention in which an exclusive property or privilege is claimed are defined as follows:

1. A method for algebraically adding values plotted to form a plurality of curves at corresponding points on said curves, comprising the steps of:
   providing a family of templates having curved edges defining a family of frequency response curves;
   drawing curves from said templates on a graph medium having first and second right angle axes thereon with said first axis representing frequency and said second axis representing either amplitude ratio or phase shift;
   positioning a trio of elements movable both with respect to each other and with respect to said graph medium in position closely adjacent to said graph medium;
   shifting the first of said trio of elements in a direction substantially parallel to said first axis to a location wherein said first element extends over and intersects said plurality of curves;
   second shifting the second of said trio of elements in a direction substantialy parallel to said second axis until said second element is positioned at a location wherein an index mark thereon is positioned directly over a fixed reference location;
   third shifting the third of said trio of elements in a direction substantialy parallel to said second axis until an index point on said third element is at a location directly over and intersecting one of said curves;
   fourth shifting the second of said trio of elements until the index point on said third element is positioned directly over said fixed reference location;
   repeating said third and fourth shifting steps above for each curve to be summed;
   returning said second element to its starting position wherein the index mark thereon is again positioned directly over said reference location; and
   marking the position of said third element on said graph medium.

2. A method as defined in claim 1, further including:
   holding said second of said trio of elements stationary during said third shifting step when said third of said trio of elements is moved to a position directly over and intersecting one of said curves; and
   holding said third of said trio of elements stationary relative to said second of said trio of elements during said forth shifting step when said second of said trio of elements is moved so as to place said third element directly over said fixed reference location.

3. A method as defined in claim 2, further including:
   moving said first of said trio of elements to a new frequency position after the previous position has been marked on said graph medium;
   holding said first of said trio of elements in said new frequency position; and
   repeating said first, second, third and fourth shifting steps above for each curve to be summed at said new position; and marking the algebraic sum of said curve on said graph paper at said new frequency position.

4. A computer adapted to cooperate with a plotting medium having scaled axes extending at right angles to each other and a reference line extending in parallelism with one of said axes, said plotting medium further having a plurality of curves thereon, said computer permitting algebraic adding of values of said plurality of curves at corresponding points thereon whereby the sum can be plotted to provide a resultant curve, comprising in combination:

a planar base means adapted to have said plotting medium positioned on the upper planar surface thereof, said base means having an edge extending parallel to said one of said axes;

first slide means supported on said base means adjacent said upper surface and above said plotting medium, said first slide means extending across said plotting medium at right angles to said edge and having menas slideably engaging said edge, said first slide means being slideably movable relative to said base means in a first direction substantially parallel to said one of said axes;

second slide means mounted on and extending slideably along said first slide means, said second slide means being slideably movable relative to said first slide means in a second direction substantially parallel to the other of said axes;

said second slide means having tranverse index means thereon intermediate the ends thereof, said transverse index means being alignable with said reference line;

third slide means carried by and slideably mounted on said second slide means for sliding movement longitudinally of said first and second slide means, said third slide means being slideably movable relative to said second slide means in a third direction substantially parallel to said second direction; and said third slide means having pointer means mounted thereon for permitting marking of a point of said resultant curve on said plotting medium.

5. A computer as defined in claim 4, further including: conversion scale means mounted on said planar base means adjacent to said plotting medium, said conversion scale means including first and second scales positioned in side-by-side relationship with said first scale comprising a linear scale designing amplitude ratio, and said second scale being a nonlinear scale amplitude ratio in units of decibels; and fourth slide means slideably supported on said base means, said fourth slide means having a transparent portion positioned directly above said conversion scale means with said transparent portion having an index line extending transversely across said first and second scales for aligning corresponding values therein.

6. A computer as defined in claim 4, further including: an elongated straight edge member adapted to be positioned on said planar base means;

said first slide means including resilient means coacting with said planar means for yieldably holding said first slide means stationary relative to said planar base means, said first slide means including said second slide means mounted thereon and said third slide means mounted on said second slide means being removable from said planar base means; and mounting means having a first portion on said planar base means and a second portion on said straight edge member for permitting said straight edge member to be positioned and mounted on said planar base means adjacent the extending edge thereof when said first, second and third slide means are removed therefrom, said straight edge member having a reference edge extending substantially parallel to said extending edge of said base means.

7. A computer as defined in claim 4, wherein: said second slide means has a groove extending longitudinally thereof;

said transverse index means having a portion thereof resiliently held within said groove and slideable therealong for permitting the position of said transverse index means to be adjusted longitudinally relative to said second slide means.

8. A computer as defined in claim 4, further including means mounting said transverse index means on said second slide means for permitting the position of said transverse index means to be adjusted longitudinally relative to said second slide means.

9. A computer as defined in claim 4, further including tongue-and-groove means cooperating between said second and third slide means for permitting slideable movement of said third slide means relative to said second slide means solely in the longitudinal direction of said second slide means.

10. A computer as defined in claim 4, wherein: said third slide means includes a base portion and a fluid reservoir means and means mounting said reservoir means on said base portion for relative linear movement therebetween in a direction substantially transverse to said planar base means, and said pointer means comprising a marking pen in communication with said fluid reservoir means and having a point positioned closely adjacent to and directly above said base means; and resilient means positioned between said base portion and said reservoir means for biasing said reservoir means upwardly away from said base portion for maintaining the point of said pen adjacent to but out of engagement with the plotting medium positioned on the upper surface of said base means, manual depression of said reservoir means linearly downwardly toward said base portion causing said resilient means to be compressed whereby the point of said pen contacts said plotting medium.

11. A computer according to claim 10, wherein said mounting means for the reservoir means includes pin means fixedly secured to said base portion and extending upwardly therefrom, said reservoir means having opening means therein into which extends said pin means for permitting said reservoir means to be slideably but detachably mounted on said base portion.

12. A computer as defined in claim 9, wherein said first slide means extends substantially across the width of said planar base means, and wherein said second slide means is mounted on and extends slideably along the longitudinal length of said first slide means and has a length substantally greater than the length of said first slide means.

13. A computer as defined in claim 4, further including:

a family of templates having curved edges defining a family of frequency response curves, said templates being positionable on said planar base means in overlying relationship to said plotting medium for permitting frequency response curves to be plotted thereon, each of said templates having a pair of substantially transverse reference lines thereon adapted to be aligned with reference lines formed on said plotting medium for permitting said templates to be properly positioned.

14. A computer as defined in claim 13, wherein: said plotting medium comprises a sheet of semi-log graph paper positioned on said base means with said plurality of curves being located on said sheet of graph paper, said graph paper having a linear scale extending in a direction substantially transverse to the extending edge of said planar base means;

said one scale axis extending in the direction of the semi-log scale being designated as a frequency scale and said other scaled axis extending transversely thereto being designated as the amplitude ratio or phase shift;

said reference line being drawn on said graph paper and extending thereon substantailly parallel to said one scaled axis and representing an amplitude ratio of zero decibles or a phase shift of zero degrees, one of the transverse reference lines formed on said templates being alignable with the reference line formed on said graph paper for permitting said templates to be properly positioned relative to said graph paper for plotting desired frequency response curves thereon.

References Cited

UNITED STATES PATENTS

| | | |
|---|---|---|
| 2,007,986 | 7/1935 | Sprague. |
| 2,614,360 | 10/1952 | Hite. |
| 2,620,256 | 12/1952 | Kern et al. |
| 3,108,381 | 10/1963 | Kuebler. |
| 3,166,845 | 1/1965 | Pascoe et al. |
| 3,258,776 | 6/1966 | Boyle et al. |

WILLIAM D. MARTIN, JR., Primary Examiner

U.S. Cl. X.R.

33—76, 189